(12) United States Patent
Ennis

(10) Patent No.: US 7,168,123 B2
(45) Date of Patent: Jan. 30, 2007

(54) FLEXIBLE COUPLING FOR A BRUSH ASSEMBLY OF A VEHICLE WASHING APPARATUS AND METHOD OF MANUFACTURING THE SAME

(76) Inventor: G. Thomas Ennis, 235 W. Florence Ave., Inglewood, CA (US) 90301

( * ) Notice: Subject to any disclaimer, the term of this patent is extended or adjusted under 35 U.S.C. 154(b) by 577 days.

(21) Appl. No.: 10/448,410

(22) Filed: May 30, 2003

(65) Prior Publication Data

US 2004/0237232 A1 Dec. 2, 2004

(51) Int. Cl.
*B60S 3/06* (2006.01)
(52) U.S. Cl. ............... 15/53.2; 15/53.3; 15/97.3; 15/DIG. 2
(58) Field of Classification Search ............ 15/53.2, 15/53.3, 97.3, DIG. 2
See application file for complete search history.

(56) References Cited

U.S. PATENT DOCUMENTS 4,198,722 A * 4/1980 Ennis .................. 15/53.3
4,225,995 A * 10/1980 Ennis .................. 15/53.3
4,354,291 A * 10/1982 Ennis .................. 15/53.3
4,513,467 A * 4/1985 Roncaglione ........... 15/53.3
4,628,562 A * 12/1986 Roncaglione ........... 15/53.3
5,361,443 A * 11/1994 Belanger et al. ......... 15/97.3
5,511,272 A * 4/1996 Belanger et al. ......... 15/53.3

* cited by examiner

*Primary Examiner*—Ranall Chin
(74) *Attorney, Agent, or Firm*—Mattingly, Stanger, Malur & Brundidge, P.C.

(57) ABSTRACT

A flexible coupling device for connecting a motor to a shaft having a rotary brush mounted thereon in a vehicle washing apparatus includes a rubber sleeve, a metal cable embedded in the sleeve and a coil spring mounted around an outside of the sleeve. Connecting means are mounted at each end of the sleeve for connecting the flexible coupling to the motor and the shaft on which the brush is mounted. A retainer ring is mounted adjacent each end of the sleeve for retaining the metal coil spring in place. Safety clips are attached to the retainer rings to hold the ends of the metal coil spring.

10 Claims, 4 Drawing Sheets

FLEXIBLE COUPLING FOR A BRUSH ASSEMBLY OF A VEHICLE WASHING APPARATUS AND METHOD OF MANUFACTURING THE SAME

BACKGROUND OF THE INVENTION

1. Field of the Invention

This invention relates generally to a vehicle washing apparatus and, more particularly, to an improved flexible coupling for connecting a rotating brush to a motor in a vehicle washing apparatus.

2. Description of the Prior Art

Numerous devices are known in the art for washing vehicles by employing rotating brush assemblies for cleaning one or more of the front, sides and rear of a vehicle. Many such devices are known as wrap-around brush assembly vehicle washing devices. Many such wrap-around brush assembly devices use hydraulic power control systems and other means to move the brushes along the front, sides and back of the vehicle. Such control systems require close supervision and extensive maintenance and adjustment in order to operate properly. Other such devices are complex in construction.

Various solutions to the above problems have been proposed such as installing a flexible connection between the motor for rotating a brush and a shaft upon which the brush is mounted. Such flexible connections or coupling devices are shown in U.S. Pat. Nos. 4,198,722 and 4,225,995. Another type of flexible connection or coupling device is shown in U.S. Pat. No. 4,345,291 wherein a metal coil spring is used to couple a shaft from a motor to another shaft on which a rotary brush is mounted. It also has been known to use a rubber cylinder or sleeve having a cable embedded therein in a coupling device for coupling a motor to a brush. While many of these prior art devices have generally been satisfactory, there still is a need for an improved flexible coupling device for a vehicle washing apparatus which is simple and economical in construction while still being reliable and safe in operation.

SUMMARY OF THE INVENTION

It is an object of the present invention to provide a flexible coupling device for connecting a motor to a shaft on which a brush is mounted in a vehicle washing apparatus wherein the flexible coupling device includes a rubber sleeve, a metal cable embedded in the sleeve, and a metal coil spring mounted around the outside of the sleeve.

A further object of the invention is provide a flexible coupling device in a vehicle washing apparatus which provides better control of and helps modulate the flexibility of the coupling.

Another object of the invention is to provide a flexible coupling device in a vehicle washing apparatus which improves the safety and reliability thereof.

A further object of the invention is to provide a flexible coupling device in a vehicle washing apparatus wherein the flexible coupling device absorbs torque and thereby decreases the starting torque on a motor/gear box, due to the flexibility of the coupling.

A still further object of the invention is to provide a flexible coupling device in a vehicle washing apparatus which is simple and economical in construction.

The present invention achieves the above and other objects by providing in a vehicle washing apparatus having a frame, a rotary brush mounted on a shaft supported by the frame and a motor for rotating the shaft and the brush, a flexible coupling device for connecting the motor/gear box to the shaft which includes a rubber sleeve, a metal cable embedded centrally in the sleeve, a metal coil spring mounted around the sleeve and connecting means mounted at each end of the sleeve for connecting the flexible coupling to the motor and the shaft on which the brush is mounted. The flexible coupling is particularly adapted for use in connection with a wrap-around brush for washing the front, sides and rear of a vehicle whereby the flexible coupling permits the brush to flex in any direction to tilt the brush as it moves around outer surfaces of the vehicle and to return the brush to its normal position through the restoring forces of the flexible coupling.

The metal cable is wound in a clockwise direction for use in connection with a brush which is rotated in a clockwise direction and the metal cable is wound in a counter clockwise direction for use in connection with a brush which is rotated in a counter clock-wise direction. Each connecting means further includes a hub at each end of the sleeve having one end mounted inside of the sleeve and the other end extending out from the sleeve. The flexible coupling device further includes a retainer ring or plate mounted at each end of the sleeve for retaining the coil spring in place as well as at least one safety clip attached to each retainer ring to hold an end of the coil spring in place. If the cable and rubber sleeve break or otherwise fail, the safety clips will at least temporarily hold the brush and shaft on which the brush is mounted, in place.

The present invention further includes a method of manufacturing a flexible coupling device for a vehicle washing apparatus having a frame, a rotary brush mounted on a shaft supported by the frame and a motor for rotating the shaft and the brush wherein the flexible coupling device connects the motor/gear box and the brush shaft. The method includes the steps of attaching a connecting hub to each end of a wire cable, molding a rubber sleeve around the cable and at least a portion of each hub to embed the cable and the portion of each hub therein, mounting a metal coil spring around the sleeve and mounting a retainer ring adjacent the outer end of each of the hubs to retain the metal coil spring in place. The method further may include the step of attaching at least one safety clip to each retainer ring to hold an end of the metal coil spring in place.

These and other features and advantages of the present invention will become more apparent with reference to the following description of the drawings.

DETAILED DESCRIPTION OF THE PREFERRED EMBODIMENTS

Figure 1:
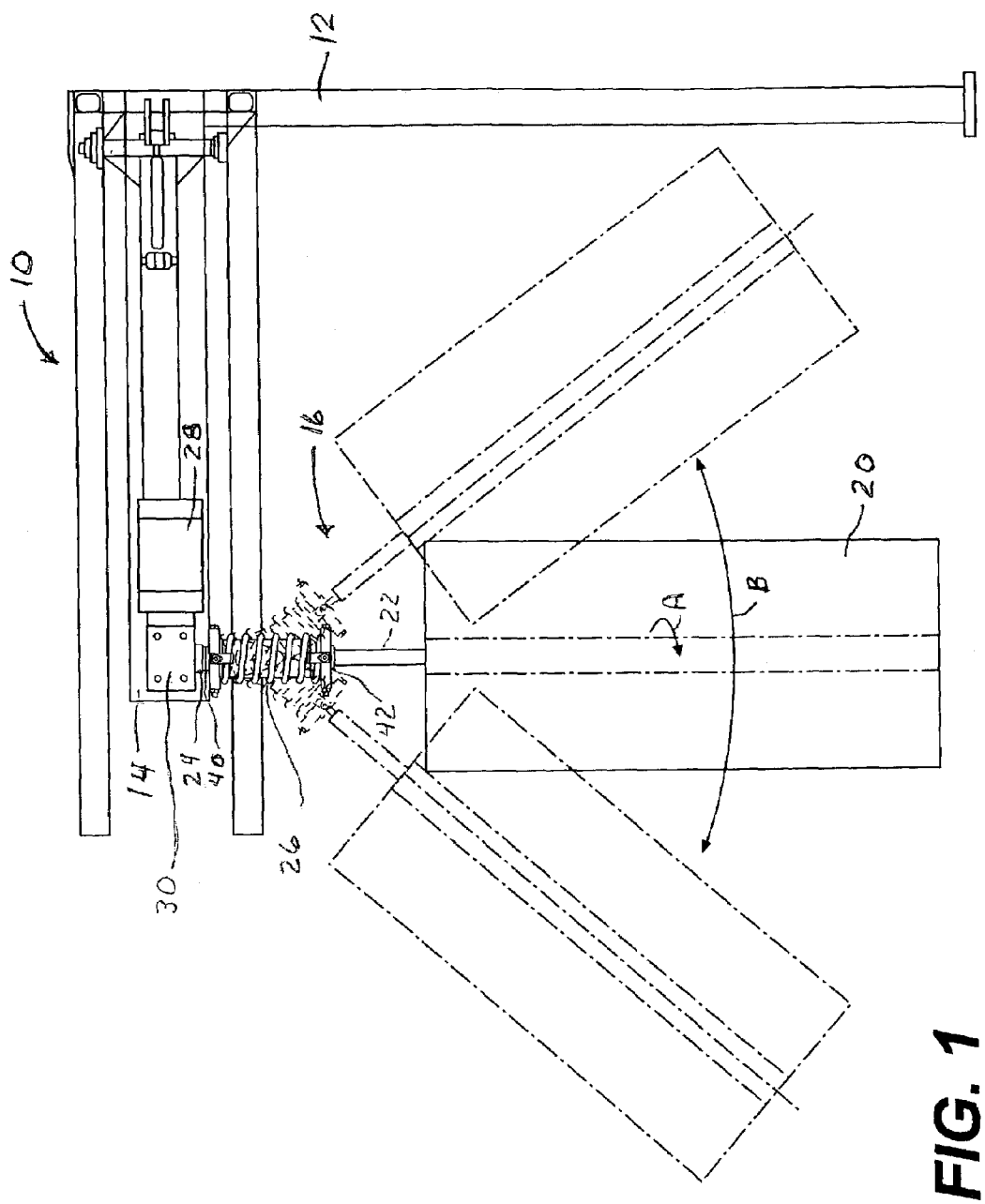
FIG. 1 is a side elevational view of a vehicle washing apparatus employing a flexible coupling device according to the present invention and showing in dotted lines the flexing or tilting of the coupling device and a brush attached thereto.

Referring to FIG. 1 of the drawings, a vehicle washing apparatus, generally referred to by the numeral 10, includes a supporting frame 12 having a swing arm 14 pivotally attached thereto. A rotary brush assembly, generally indicated by the numeral 16, is rotably attached to the outer end of the swing arm 14.

The rotary brush assembly includes a rotary brush 20 having a shaft 22 connected to the top thereof. The brush shaft 22 is connected to a drive shaft 24 by a flexible coupling device 26. The drive shaft 24 may be connected to a motor 28 through a gear box 30. The motor 28 is mounted adjacent the outer end of the swing arm 14. The motor may be an electric motor, a hydraulic motor or any other suitable type of motor. If a hydraulic motor is used, it is not necessary to also have a separate gear box. The rotary brush assembly 16 is a wrap-around brush assembly whereby as the brush washes a vehicle, and the flexible coupling 26 permits the brush to flex in any direction and tilt when it contacts a vehicle while rotating.

In the washing apparatus shown in FIG. 1, only a single brush is shown but the vehicle washing apparatus may include a pair of oppositely disposed brush assemblies mounted to the frame on swing arms which rotate or swing in opposite directions to wash the front, both sides and the back of a vehicle.

The vehicle washing apparatus as shown in FIG. 1 illustrates a brush which is designed to wash the driver's side of a car whereby the car moves into front of the brush rotating in a counter clockwise direction as indicated by the arrow A. The counter clockwise rotation causes the brush to walk along the front, one side and the back of a vehicle. During the washing of the car, the brush 20 may flex in any direction as shown by the arrow B. A brush assembly for washing the passenger side of the car opposite to the driver's side is constructed similar to the brush assembly for washing the driver's side except that the brush for washing the passenger side is rotated in a clockwise direction whereby the brush walks across the front, along the opposite side to the driver's side and the back of the vehicle.

In the brush assembly 16 as just described, the flexible coupling device 26 allows the brush to tilt or swing in any direction and also creates a restoring force to urge the brush back toward its normal vertical position. Moreover, the flexible coupling device absorbs torque and thus functions to decrease the starting torque on the motor/gear box, due to the flexibility of the coupling.

Figure 2:
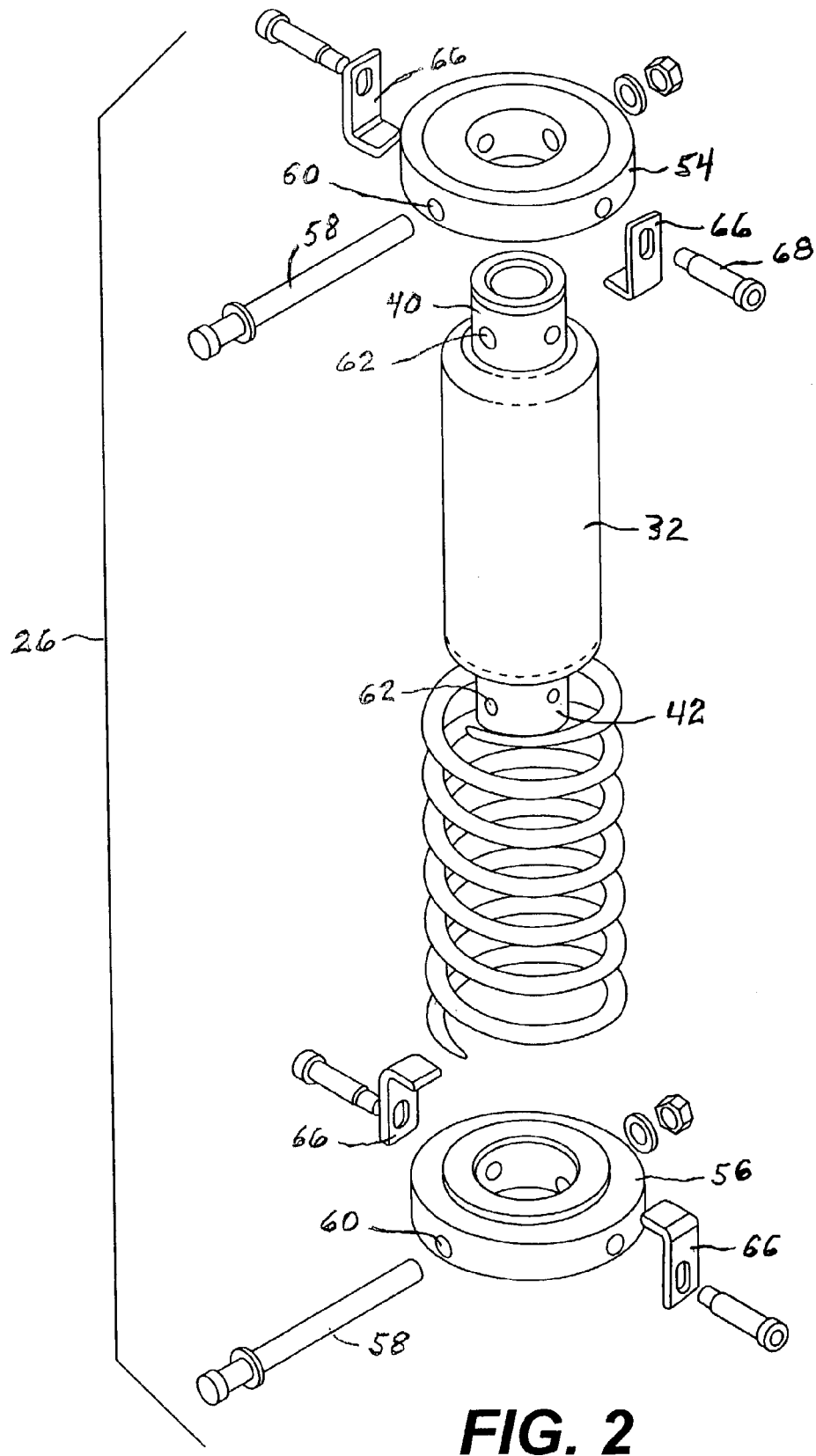
FIG. 2 is an enlarged exploded view showing the parts of the flexible coupling device.
Figure 3:
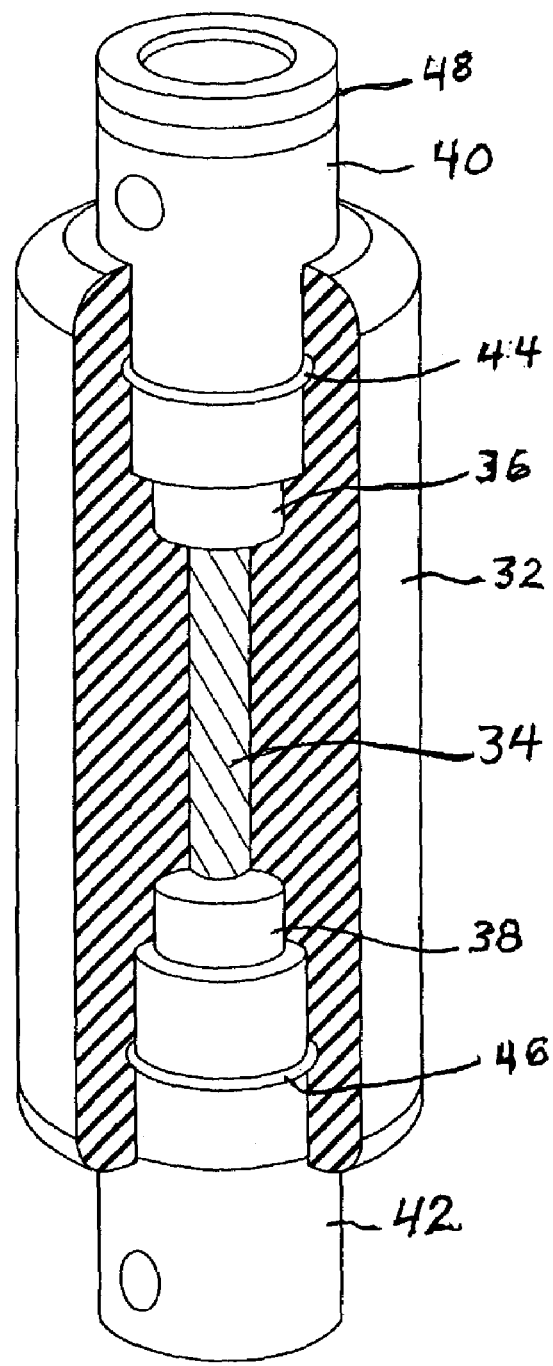
FIG. 3 is an enlarged front elevational view, partly broken away, showing a portion of the flexible coupling device.
Figure 4:
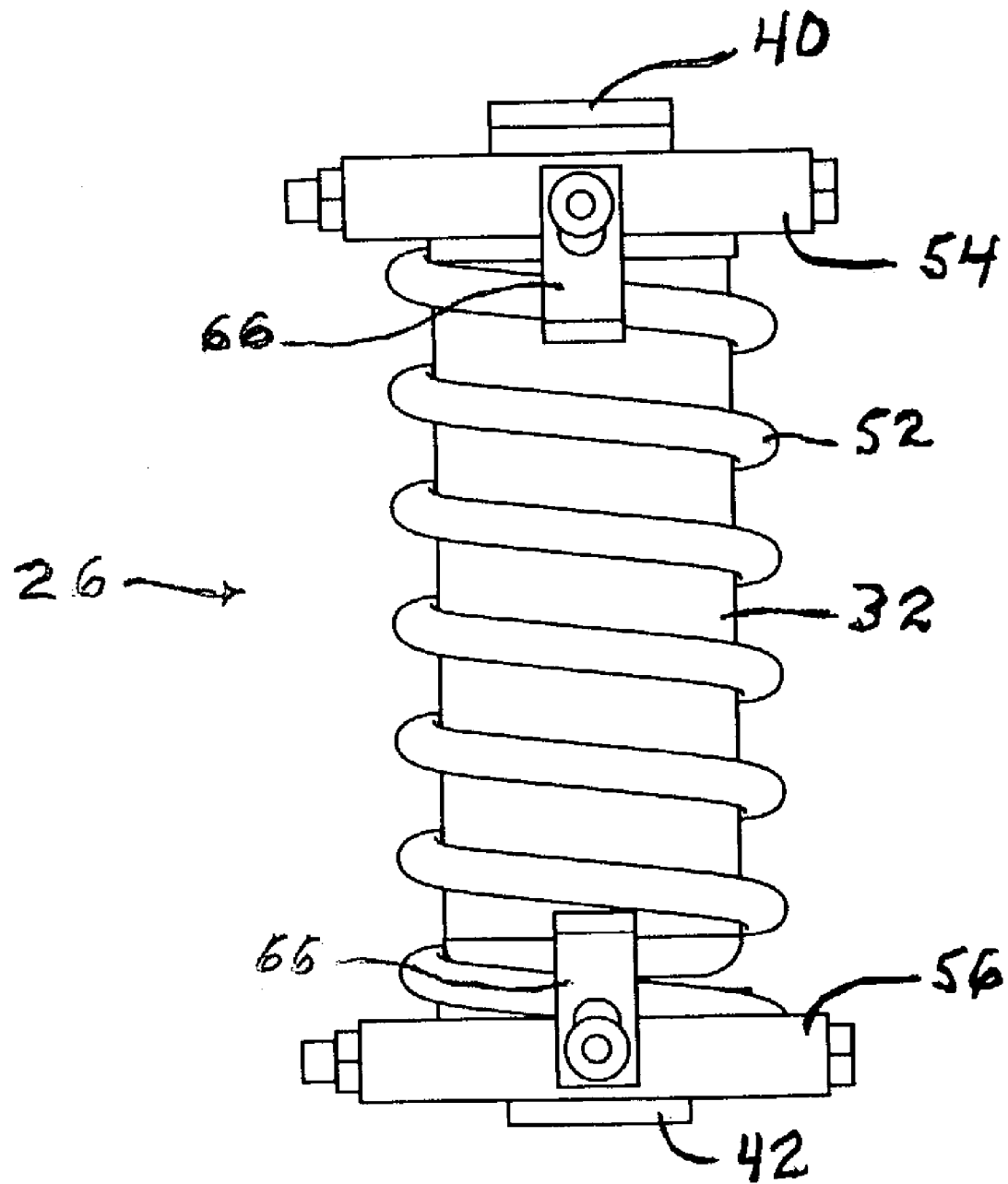
FIG. 4 is an enlarged front elevational view showing an assembled flexible coupling device of the present invention.

With reference to FIGS. 2–4, FIG. 2 is an exploded view showing various parts of the flexible coupling device 26, FIG. 3 is a view partially broken away of a portion of the flexible coupling device and FIG. 4 is a view showing the flexible coupling device assembled in an operative state.

The flexible coupling device 26 includes a rubber cylinder or sleeve 32 having embedded centrally therein a wound wire cable 34. An upper collar 36 is attached to an upper end of the cable 34 and a lower collar 38 is attached to the lower end of the wire cable by any suitable means such as welding or crimping. The upper collar 36 is mounted in a central opening of an upper hub 40 by any suitable means such as welding while the lower collar 38 is similarly mounted in a central opening of a lower hub 42. The inner end portions of both hub 40 and hub 42 are embedded in the rubber sleeve so that the outer end portions of the hubs extend outwardly from the rubber sleeve. The inner end portion of upper hub 40 is provided with a ridge or rib 44 and the inner end portion of the lower hub 42 also is provided with a similar ridge 46. The ridges 44 and 46 function to help secure the hubs in the rubber sleeve and prevent them from slipping out.

As further shown in FIG. 3, the top end portion of the upper hub 40 may be provided with identification means or indicia 48 to identify the hub as one to be installed in the upper end of the rubber sleeve for connection to a motor and to further identify the hub as containing a cable which is wound in either a clockwise or counter clockwise direction. In the rubber sleeve device shown in FIG. 3, the metal cable is wound in a counter clockwise direction for use in connection with a brush which is also to be rotated in a counter clockwise direction so that the metal cable does not tend to unwind but rather tends to wind tighter through rotation in the same direction as the metal cable is wound. The identification means or indicia 42 may include stripes, lines, grooves or any other suitable form of identification.

To effectively walk the brush around the front, side and rear of a vehicle, the brush which contacts the driver's side of the car is rotated in a counter clockwise direction while the brush which contacts the passenger side of the car rotates in a clockwise direction.

As best shown in FIGS. 2 and 4, a metal coil spring 52 is mounted around the outside of the rubber sleeve 32. An upper retainer ring 54 is mounted at the upper end of the rubber sleeve 32 while a lower retainer ring 56 is mounted at the lower end of the rubber sleeve. The retainer rings retain the ends of the coil spring to help maintain the spring in position around the rubber sleeve. Bolts 58 extend through openings 60 in the retainer rings and through holes 62 in the hubs to fasten the retainer rings at the upper and lower ends of the rubber sleeve.

Safety clips 66 having an L-shaped configuration are mounted to the outside of the retainer rings 54 and 56 to further hold the ends of the metal coil spring 52. As shown in FIG. 2 preferably two safety clips are used at each end of the coil spring. The safety clips are held in place by bolts 68 which pass through holes in the safety clips, holes in the retainer rings and corresponding holes in the hubs 40 and 42. The safety clips function as safety connecting means to assist in holding the ends of coil spring in place. In addition, if the metal cable and/or the rubber sleeve break or otherwise fail, the safety clips will at least temporarily hold the brush and the shaft on which the brush is mounted, in place so that the brush does not damage a vehicle being washed.

As shown in FIG. 1, the upper hub 40 is connected to the drive shaft 24 extending from the gear box 30 and the lower hub 42 is connected to the shaft 22 on which the brush 20 is mounted.

In the method of manufacturing the flexible coupling device, the collars 36 and 38 are mounted on the ends of the metal cable 34 and hubs 40 and 42 are secured to the collars. The metal cable, collars and inner ends of the hubs are embedded in the rubber sleeve 32 by molding the rubber therearound or by other suitable methods. The metal coil spring 52 is then mounted around the rubber sleeve 32 and the retainer rings 54 and 56 and the safety clips 66 are mounted to ends of the spring and the rubber sleeve. The assembled flexible coupling device is then ready for mounting to the drive shaft and the shaft on which the brush is mounted in a vehicle washing apparatus.

The flexible coupling device of the present invention has many advantages. The metal coil spring, in combination with the rubber sleeve and cable connections, provide a strong, safe and reliable means for connecting the motor to the brush shaft. The spring provides additional control of the rigidity and helps modulate the flexibility of the coupling device while providing a further safety feature in case of a breakage of any other part of the coupling device. The rubber sleeve and cable together absorb torque of the rotation forces while the spring helps stabilize and modulate the flexibility and provides an excellent safe connection between the motor means and the shaft brush.

Numerous other modifications and adaptations of the present invention will be apparent to those skilled in the art and thus, it is intended by following claims to cover all such modifications and adaptations which fall within the true spirit and scope of the invention.

I claim:

1. In a vehicle washing apparatus having a frame, a rotary brush mounted on a shaft supported by said frame and a motor for rotating said shaft and said brush, a flexible coupling device for connecting said motor to said shaft, comprising:
   a rubber sleeve;
   a metal cable embedded in said sleeve;
   a metal coil spring mounted around an outside of said sleeve; and
   connecting means mounted at each end of said sleeve for connecting said flexible coupling device to said motor and said shaft.

2. A vehicle washing apparatus according to claim 1, wherein said brush is a wrap around brush for washing the front, sides and rear of a vehicle and said flexible coupling device permits said brush to flex in any direction to tilt said brush.

3. A vehicle washing apparatus according to claim 1, wherein said metal cable is wound in a clockwise direction.

4. A vehicle washing apparatus according to claim 1, wherein said metal cable is wound in a counter clockwise direction.

5. A vehicle washing apparatus according to claim 1, wherein each said connecting means includes a hub having one end embedded inside of said sleeve and another end extending out from said sleeve.

6. A vehicle washing apparatus according to claim 5, wherein each said hub has a ridge on said one end embedded inside of said sleeve.

7. A vehicle washing apparatus according to claim 5 wherein one of said hubs is provided with identification means on said another end extending out from said sleeve, indicating a direction of rotation in which said flexible coupling device is designed to rotate.

8. A vehicle washing apparatus according to claim 1, wherein said flexible coupling device further comprises a retainer ring mounted adjacent each end of said sleeve for retaining said metal coil spring in place.

9. A vehicle washing apparatus according to claim 8, wherein said flexible coupling device further comprises at least one safety clip attached to each said retainer ring to hold an end of said metal coil spring in place.

10. In a vehicle washing apparatus having a frame, a rotary brush mounted on a shaft supported by said frame and a motor for rotating said shaft and said brush, a flexible coupling device for connecting said motor to said shaft, comprising:
    a rubber sleeve;
    a metal cable embedded in said sleeve;
    a metal coil spring mounted around an outside of said sleeve;
    a hub mounted adjacent each end of said sleeve for connecting said flexible coupling device to said motor and said shaft;
    a retainer ring mounted adjacent each end of said sleeve for retaining said metal coil spring in place; and
    at least one safety clip attached to each said retainer ring to hold an end of said metal coil spring.

* * * * *